United States Patent

Sarati et al.

[15] 3,657,470

[45] Apr. 18, 1972

[54] CONTROL SYSTEM FOR LINE CONCENTRATOR OF COMMUNICATION NETWORK

[72] Inventors: Luigi Sarati; Gianfranco Battiston, both of Milan, Italy

[73] Assignee: Societa Italiana Telecommunicazioni Siemens S.p.A., Milan, Italy

[22] Filed: Oct. 7, 1970

[21] Appl. No.: 78,693

[30] Foreign Application Priority Data

Oct. 9, 1969 Italy ..........23122 A/69

[52] U.S. Cl. ..........178/3, 340/163

[51] Int. Cl. ..........H04l 15/24

[58] Field of Search ..........178/3; 340/163, 413; 179/18 FF, 18 FG, 18 FC

[56] References Cited

UNITED STATES PATENTS 3,531,772 9/1970 Dalyei et al. ..........340/163

3,522,587 8/1970 Brown, Jr. ..........340/147

*Primary Examiner*—Kathleen H. Claffy

*Assistant Examiner*—Thomas W. Brown

*Attorney*—Karl F. Ross

[57] ABSTRACT

A line concentrator with $m$ incoming telegraph lines, each adapted to carry messages on any of $n$ different frequency channels, includes a selector which cyclically scans all the $m \cdot n$ available signal paths by successively exploring all the channels of the first line, all the channels of the second line and so on, the switchover from one path to the next proceeding in response to stepping pulses from a timing stage under the control of an associated monitoring stage. With some of the signal paths programmed for the reception of messages thereover whereas others are maintained idle, the timing stage transmits to the monitoring stage an enabling signal whenever the selector advances onto a programmed path whereby a message arriving over such path is directed to a multiplex receiver which detects a start and stop code to send a termination signal to the timing stage which thereupon steps the selector. A train of clock pulses, supplied to the timing stage, causes the immediate emission of a stepping pulse to advance the selector if the path is not programmed, and also generates such a stepping pulse in response to a malfunction or nonutilization signal from the monitoring unit produced upon prolonged persistence of the same voltage level on a programmed path.

12 Claims, 5 Drawing Figures

INVENTORS:
Luigi Sarati
Gianfranco Battiston

BY Karl F. Ross
Attorney

INVENTORS:
Luigi Sarati
Gianfranco Battiston
BY
Karl F. Ross
Attorney

Patented April 18, 1972 3,657,470

5 Sheets-Sheet 3

Patented April 18, 1972

3,657,470

5 Sheets-Sheet 4

Patented April 18, 1972

3,657,470

5 Sheets-Sheet 5

INVENTORS:
Luigi Sarati
Gianfranco Battiston
BY
Karl F. Ross
Attorney

CONTROL SYSTEM FOR LINE CONCENTRATOR OF COMMUNICATION NETWORK

Our present invention relates to a control system for a line concentrator used in a telecommunication network.

Such a system is utilized, for example, to gather information from a plurality of outlying stations designed to transmit data on the condition of various instruments located thereat, these stations feeding a common terminal via respective signal paths which are scanned in cyclic succession by a selector at the terminal. Frequently, only some of the outlying stations are in condition to transmit data or contain information of interest at a particular time; thus, the selector may be required to dwell only on the active signal paths while skipping relatively rapidly over those found to be idle. The active or idle condition of an outlying station may be ascertained by a multiplex receiver, located at a greater or lesser distance from the terminal, which evaluates the messages successively arriving over a transmission link and distributes them to their proper destinations. Thus, the advance of the selector may be controlled by a stepping signal from the receiver indicating either the end of a message delivered over a particular signal path or the absence of any message from such path.

While an arrangement of this description accelerates the exploration of the incoming paths as compared with a system in which the selector connects each path to the receiver for a predetermined period, there exists nevertheless the need for allowing enough time to enable an evaluation of the operating condition of each path before the selector can be stepped. It is, therefore, an object of our present invention to provide means in such a system for reducing the unproductive intervals during which the selector comes to rest on the terminations of signal paths other than those from which information is to be gathered at any particular stage of operation.

Another object of the invention is to provide a system of this type adapted for the reception of continuous messages of variable length via any signal path.

A further object, allied with the preceding one, is to provide means for limiting the length of exploration of a given signal path found to be in a defective state or devoid of significant information.

In accordance with this invention, a manually or automatically switchable programmer indicates the active state of a signal path, i.e., the readiness of the corresponding station to send out messages of interest at the time, by marking the selector-controlled gate or gates associated with such path; upon encountering the termination of a signal path not so marked, the selector is immediately advanced by its stepping means which may include a source of clock pulses, the advance then occurring on the next-following clock pulse.

If a path is marked as active by the programmer, the corresponding gate is opened with activation of monitoring means beyond that gate and with concurrent inhibition of the advance of the selector until a release command from the monitoring means restarts the selector in response to a predetermined signal condition on the path currently scanned. The monitoring means advantageously includes a decoder at (or ahead of ) the receiver, adapted to detect a predetermined synchronization code serving as an end-of-message signal, as well as a timing circuit controlled by the aforementioned clock pulses for measuring an interval of predetermined length during which no change in signal condition takes place on the scanned path and whose occurrence therefore indicates either a malfunction or the absence of a message on such path. In the specific system described hereinafter by way of example, the messages are code combinations of marks and spaces representing one or more 12-bit words, followed by a 12-bit synchronization code consisting entirely of marks (binary value "1"). With the last bit of any such word invariably represented by a "0" or space, and with each word including at least one bit "1" or mark, an unbroken succession of 24 bits of like magnitude cannot normally occur. Such a series of 24 marks (or spaces), recurring in the rhythm of the clock pulses, loads a multistage digital counter to generate the release command for stepping the selector.

In a system in which the message transmitted by an outlying station is repeated an indefinite number of times, the recurring synchronization code represents both a start and a stop signal. A bistable element or flip-flop is then alternately set and reset by the decoder output in response to this start/stop signal in order to produce the release command only upon resetting, i.e., after every second occurrence of the code, so as to permit reception of the complete message bracketed thereby.

Although, in principle, the signal paths could be constituted by individual transmission lines or radio links, it is generally advantageous to establish them as combinations of lines and frequency channels. Thus, with $m$ lines carrying $n$ channels each, the total number of available paths is $mn$. The $m$ lines may radiate from the common terminal in different directions while a group of $n$ stations served by each line may be clustered about its remote end. The switching stage at the terminal then includes $m$ line gates and $n$ channel gates connected in cascade, with interposition of respective channel filters and demodulators, and the selector scans a signal path by concurrent temporary closure of the corresponding line and channel gates. In such a system, the programmer marking an active signal path in accordance with our invention includes coincidence means with one set of inputs respectively connected to one group of outputs of the selector, preferably the ones controlling the several line gates, and with another set of inputs each connected to any number of selector outputs of another group, e.g., the group of outputs controlling the channel gates. Upon concurrent energization of an output from each group by the selector, a test circuit may thus be closed to generate an unblocking signal for the switching stage together with an inhibition signal for the selector advance. This unblocking signal may be produced by a monostable multivibrator or monoflop tripped in response to an output pulse from the coincidence means. A logical feedback circuit may then maintain this unblocking signal for an indefinite period, i.e., until that circuit is broken by the arrival of the release command.

The above and other features of our invention will be described in detail hereinafter with reference to the accompanying drawing in which.

Figure 1:
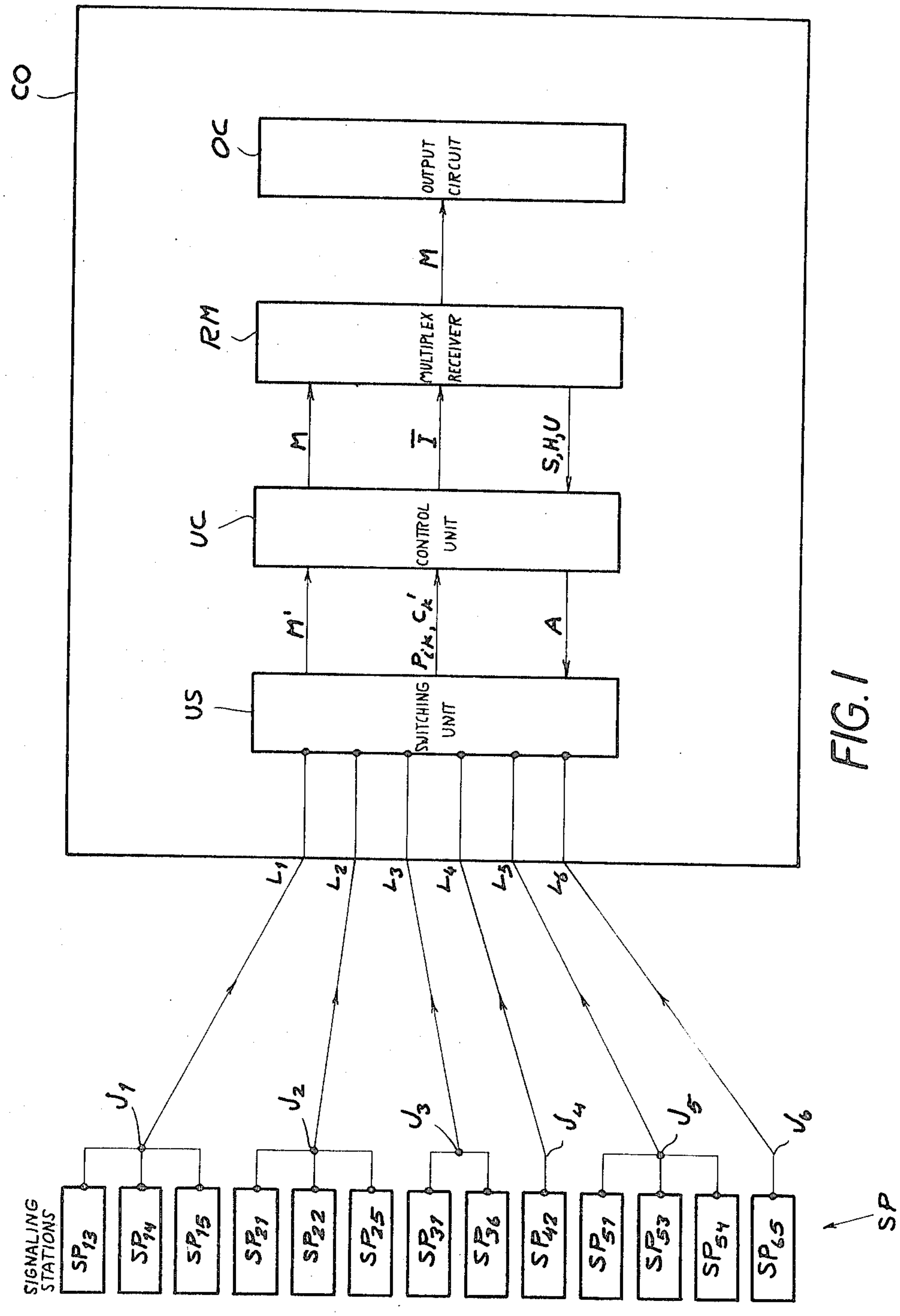
FIG. 1 is a block diagram showing the overall organization of a telecommunication network including a control system according to the invention.

The system shown in FIG. 1 includes up to 36 outlying stations, generally designated SP, serving a common terminal CO including a switching unit US, a control unit UC, a multiplex receiver RM and an output circuit OC for the latter. The receiver, though shown closely juxtaposed with control unit UC, may also be connected to the latter via a transmission link of appreciable length, this connection being here indicated diagrammatically as a set of parallel lines carrying message signals M as well as an inverted inhibition signal $\overline{I}$ from unit UC to receiver RM and several signals S (synchronization), H (clock) and U (activation) in the opposite direction. Similar connections between units US and UC carry message signals M' and programming information $P_{ik}$, $C_k'$ to the control unit UC and advance signals A to the switching unit US. The final message signals M are forwarded to output circuit OC which may include a distributor supplying them to different indicators, tape recorders or similar individually associated with the several stations SP.

In the specific embodiment illustrated, only 13 of these stations are deemed to be active. They include three stations $SP_{13}$, $SP_{14}$, $SP_{15}$ served by a first transmission line $L_1$ via respective frequency channels, i.e., the No. 3, No. 4 and No. 5 channels thereof; three stations $SP_{21}$, $SP_{22}$, $SP_{25}$ served by a second line $L_2$ via channels Nos. 1, 2 and 5; two stations $SP_{31}$, $SP_{36}$ served by the No. 1 and No. 6 channels of a third line $L_3$; one station $SP_{42}$ served by the second channel of a fourth line $L_4$; three stations $SP_{51}$, $SP_{53}$, $SP_{54}$ served by channels Nos. 1, 3 and 4 of a fifth line $L_5$; and one line $SP_{65}$ served by the fifth channel of a sixth and last line $L_6$. The frequency ranges of corresponding channels on the several transmission lines $L_1$ – $L_6$ are assumed to be identical.

Although not so illustrated, the lines $L_1$ – $L_6$ may radiate from terminal CO in different directions to the junctions $J_1$ – $J_6$ of their associated feeder lines, these junctions including the necessary equipment for modulating the incoming information onto the various carrier frequencies.

Figure 2:
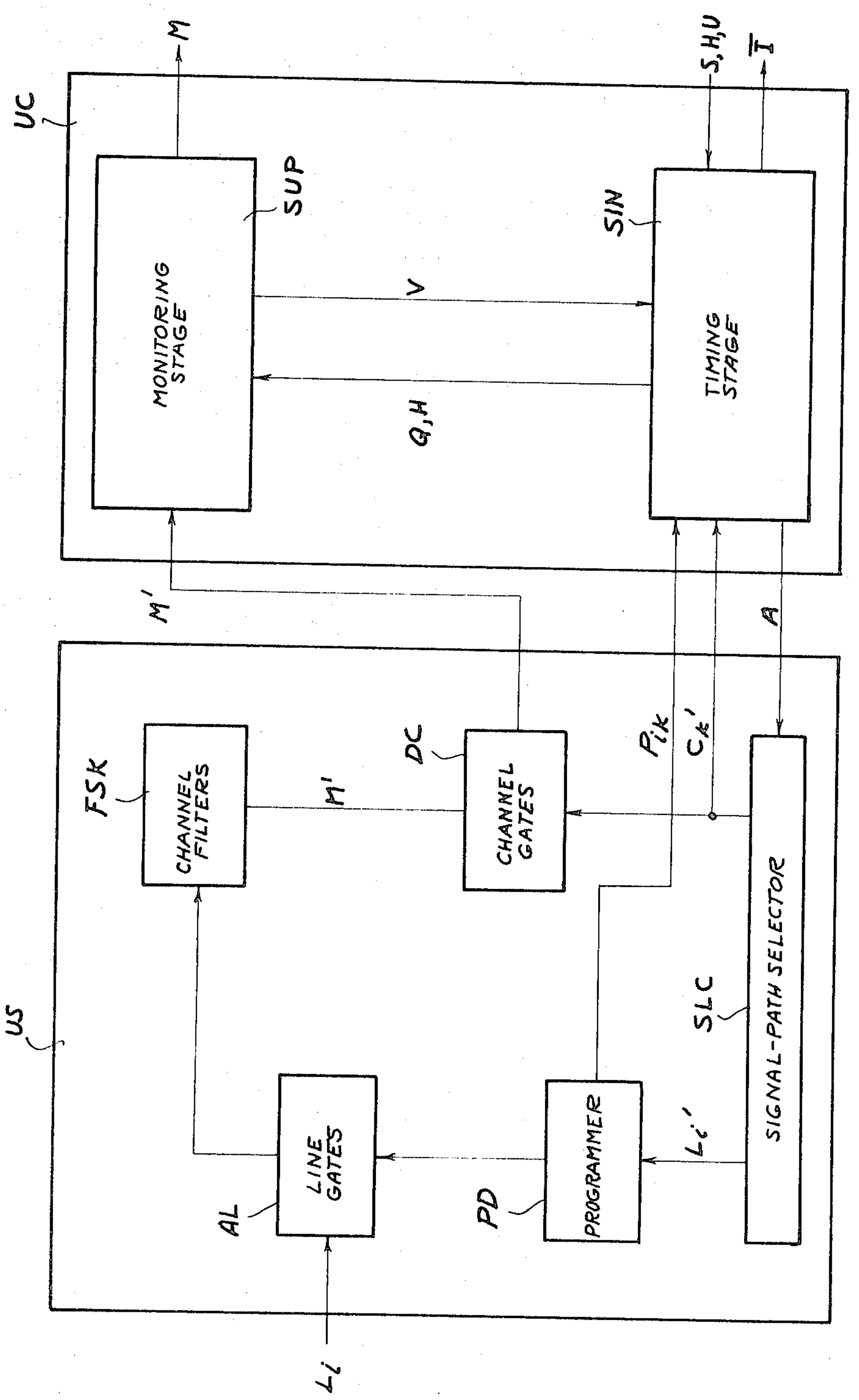
FIG. 2 is a more detailed block diagram showing the common terminal equipment.

In FIG. 2 we have generically indicated at $L_i$ one of the six incoming lines $L_1$ – $L_6$ leading to a set of line gates Al in switching unit US. A selector SLC of that unit, receiving the advance or stepping signals A, has a group of six outputs $L_i'$, controlling the line gates Al by way of a programmer PD, and another group of six outputs $C_k'$ carrying the correspondingly designated signals of FIG. 1 to a set of channel gates DC. A set of channel filters FSK are interposed between line gates Al and channel gates DC to separate the several frequency channels of any line whose gate is extended to it, via the corresponding line gate, under the control of selector SLC; thus, up to six messages M' may reach the channel gates DC at a given instant if all the six frequency channels of a selected line are programmed. From the channel extended to control unit UC by the corresponding channel gate, the message M' is intercepted by a monitoring stage SUP of unit UC before appearing as message M in the output of that unit. Another subunit, shown as a timing stage SIN, receives the information $P_{ik}$, $C_k'$ from programmer PD and selector SLC, respectively, while feeding the stepping signal A to the latter; this stage also sends the inverted inhibition signal $\bar{I}$ to receiver RM and an accompanying unblocking signal Q to stage SUP while obtaining the signals S, H, U from that receiver and an internal switching signal V from unit SUP.

Figure 3:
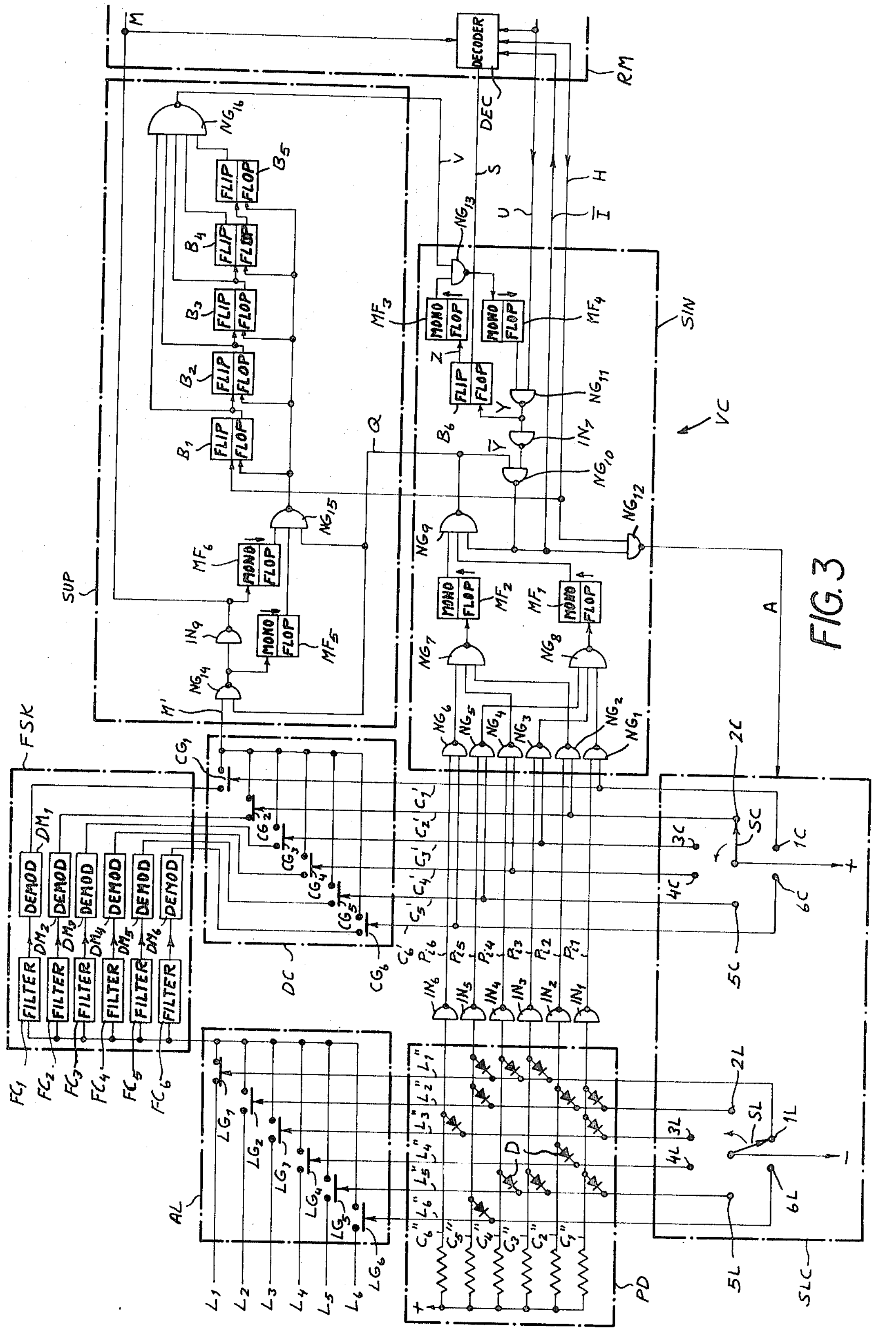
FIG. 3 is a circuit diagram of the elements shown in block form in FIG. 2.

The components diagrammatically shown in FIG. 2 have been illustrated in greater detail in FIG. 3.

For the sake of clarity, selector SLC has been illustrated as comprising two wipers SC (for channel selection) and SL (for line selection) with associated bank contacts 1C – 6C and 1L – 6L, respectively; in practice, advantageously, these two sections are designed as a pair of cascaded electronic counters of six binary stages each, with the line-scanning counter advancing one step for every six steps of the channel-scanning counter. The six outputs $C_1'$ – $C_6'$ of the first selector section terminate at respective gates $CG_1$ – $CG_6$ of switching stage DC which are normally closed and have been schematically represented by normally open switches, the second switch $CG_2$ being shown closed by output $C_2'$ energized via wiper SC standing on its bank contact 2C. Similarly, the six outputs $L_1'$ – $L_6'$ of the second selector section terminate at respective gates $LG_1$ – $LG_6$ of switching stage Al, the first switch $LG_1$ being shown closed by output $L_1'$ energized via wiper SL standing on its bank contact 1L. Filters $FC_1$ – $FC_6$ in channel separator FSK serve in this position to route the several frequency channels of line $L_1$ to respective demodulators $DM_1$ – $DM_6$ working into corresponding inputs of gating circuit DC, it being assumed in accordance with the pattern of active stations shown in FIG. 1 that only the 3rd, 4th and 5th channels of that line are active so that the opening of gate $CG_2$ is ineffectual.

Timing stage SIN of unit UC comprises a set of six NAND-gates $NG_1$ – $NG_6$ with first inputs connected to respective selector outputs $C_1'$ – $C_6'$ and with second inputs connected, via leads $P_{i6}$ and inverters $IN_1$ – $IN_6$, to respective output leads $C_1''$ – $C_6''$ of programmer PD. This programmer is designed as a cross-bar switch adapted to establish a unidirectionally conductive connection between any of its six continuously energized leads $C_1''$ – $C_6''$ and one or more of the intersecting output leads $L_1'$ – $L_6'$ of selector SLC. The 13 junctions actually established by this programmer, in conformity with the pattern of FIG. 1, have been indicated by diodes D; it will be understood that this pattern may be varied, from time to time, by manual adjustment or by some conventional signal detector determining the activities of the incoming lines.

With the indicated polarities of wiper SL, leads $C_1''$ – $C_6''$ and diodes D, the potential of lead $C_3''$, $C_4''$ and $C_5''$ is lowered as long as wiper SL stands on bank contact 1L so that the corresponding inputs of NAND-gates $NG_3$, $NG_4$ and $NG_5$ receive a true signal from inverters $IN_3$, $IN_4$ and $IN_5$, respectively. As long as the second input of none of these NAND gates is energized by wiper SC, as is true in the illustrated selector position, all these gates conduct. The even-numbered NAND-gates $NG_2$, $NG_4$, $NG_6$ work into a triple NAND-gate $NG_7$, having an output $X_7$, while the odd-numbered gates $NG_1$, $NG_3$, $NG_5$ feed another such NAND-gate $NG_8$ having an output $X_8$. Under the described conditions, neither output $X_7$, $X_8$ is true so that two monoflops $MF_1$ and $MF_2$, respectively connected to NAND gates $NG_8$ and $NG_7$, are not tripped. A further NAND-gate $NG_9$ has three inputs respectively connected to the off-normal outputs of monoflops $MF_1$, $MF_2$ and the output of a NAND-gate $NG_{10}$; the latter receives the output Q of NAND-gate $NG_9$ and the output $\bar{Y}$ of an inverter $IN_7$ to which a signal Y is supplied by a NAND-gate $NG_{11}$. Signal Y is also applied to the resetting input of a flip-flop $B_6$ which, upon being set, generates a signal Z whose subsequent disappearance trips a monoflop $MF_3$ working into a NAND-gate $NG_{13}$; the latter additionally receives the switching signal V from stage SUP. NAND-gate $NG_{13}$ generates a release command by tripping another monoflop $MF_4$ which, by its off-normal output, feeds the NAND-gate NG further receiving the activating signal U from circuit RM. Flip-flop $B_6$ is also alternately set and reset by the signal S from receiver RM.

Unblocking or enabling signal Q further goes to a NAND-gate $NG_{14}$ in stage SUP also receiving the message signals M', it being assumed that these latter signals are a series of binary code pulses which are inverted by gate $NG_{14}$ in the presence of signal Q. The output of NAND-gate $NG_{14}$ is fed directly to a monoflop $MF_5$ and by way of an inverter $IN_9$ to another monoflop $MF_6$, the normal outputs of both these monoflops being applied together with signal Q to a triple NAND-gate $NG_{15}$ feeding a five-stage binary counter composed of flip-flops $B_1$ – $B_5$. The five stages of this counter have outputs connected to a NAND-gate $NG_{16}$ generating the signal V in response to a count of 24. A decoder DEC in receiver RM detects a synchronizing code in message M, assumed to consist of twelve consecutive marks or bits of value "1," to produce the signal S in response thereto. Clock pulses H, delivered by a timer not shown, reach one input of a NAND-gate $NG_{12}$ whose other input normally receives the inverted inhibition signal $\bar{I}$ from NAND-gate $NG_{10}$; in the presence of this latter signal, therefore, the output A of gate $NG_{12}$ constitutes a set of stepping pulses which are the inversion of the clock pulses H and serve to advance the selector SLC. Pulses H are also fed to a stepping input of the first counter stage $B_1$.

Figure 4:
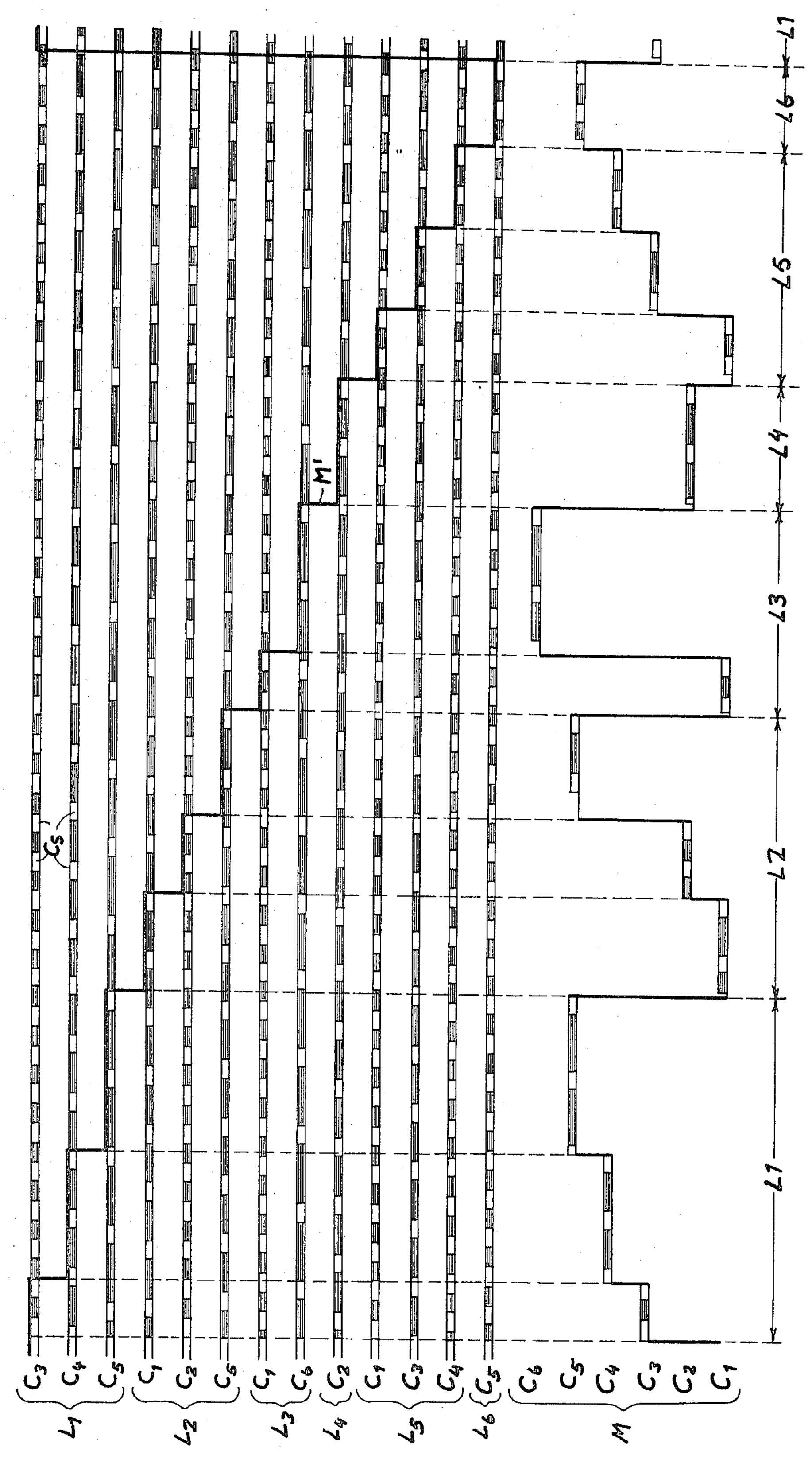
FIG. 4 is a timing diagram relating to the transmission of incoming messages from several outlying stations to the terminal.

FIG. 4 shows the nature of the messages appearing on the programmed channels of FIG. 1, each of these messages comprising a recurrent information part (shaded) interleaved with a synchronizing code $C_s$. The length of code $C_s$ is constant (i.e., twelve bits in the example given above) whereas that of the information part varies from one channel to the other in multiples of 12 bits (the last of them a space). As indicated by the heavy stepped line M', the switchover from one signal path (e.g., channel $C_5$ of line $L_1$) to the next (e.g., channel $C_1$ of line $L_2$) occurs always at the end of the second full code $C_s$. The final message M, as also seen in FIG. 4, differs from the raw message M' by the suppression of certain portions during brief intervals required by the selector for skipping over non-programmed signal paths interspersed between the programmed ones.

Figure 5:
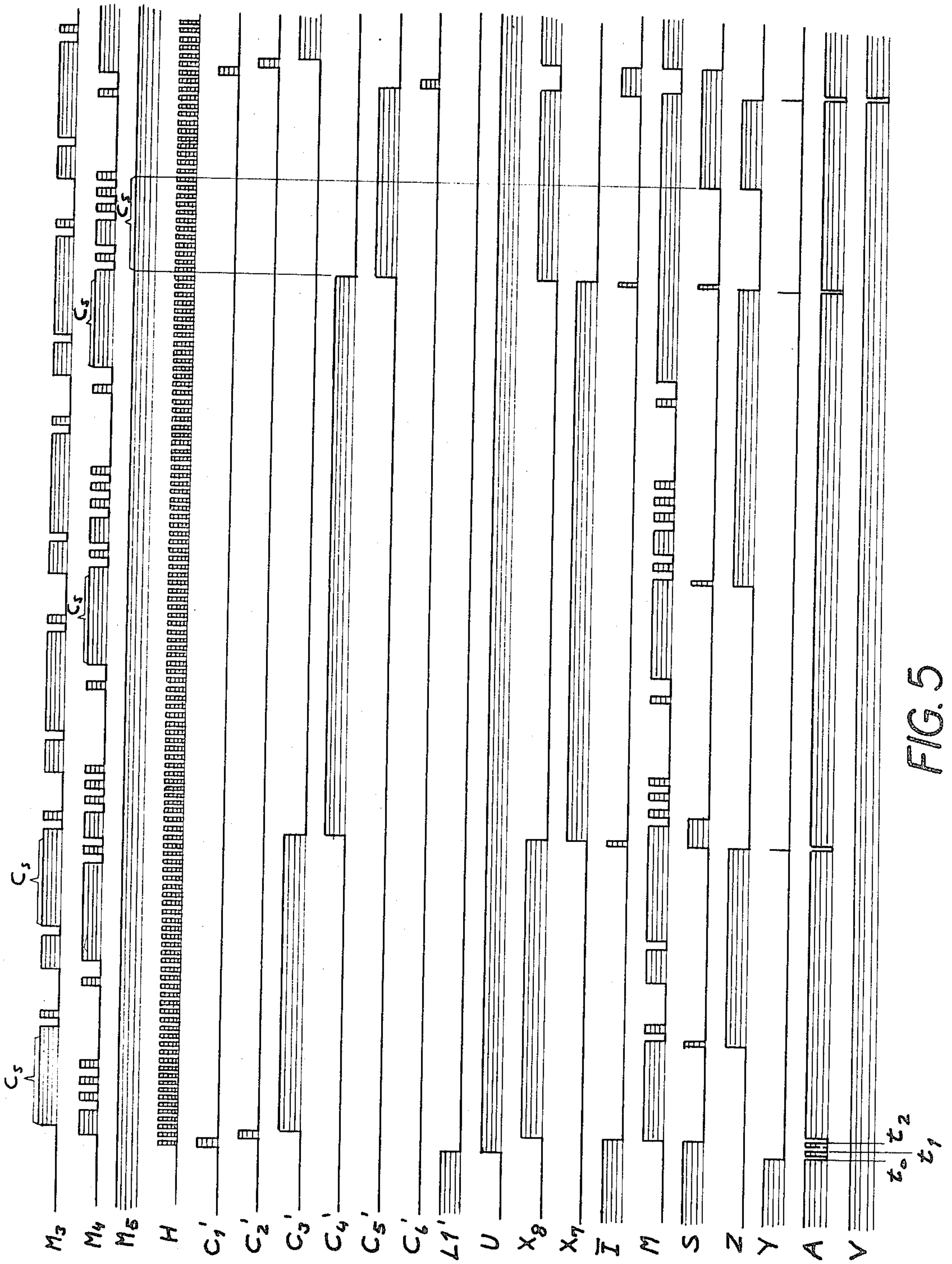
FIG. 5 is a timing diagram relating to the operation of the terminal in receiving some of these messages.

A typical sequence of operations of the system of FIG. 3 will now be described with reference to FIG. 5 which shows the message $M_3$, $M_4$, $M_5$ carried on the first three signal paths illustrated in FIG. 4, the clock pulses H, the signals appearing on selector outputs $C_1' - C_6'$ and $L_1'$, the resulting message M, as well as the various signals U, $X_8$, $X_7$, $\bar{I}$, S, Z, Y, A and V referred to above. Signal Q, in this sequence of operations, is identical with signal I, i.e., the inversion of $\bar{I}$.

Up to a time $t_o$, the system is in a quiescent state with all signals at "0" except $L_1'$, $\bar{I}$, S, Y, A and V; flip-flop $B_6$, reset by the signal Y, does not have an output Z. At time $t_o$ the activation signal U and the clock pulses H are turned on; with signal U now permanently at "1," AND-gate $NG_{11}$ functions simply as an inverter with its output Y normally suppressed.

It will also be assumed, for the purpose of this explanation, that the wiper SC of selector SLC stands on its contact 6C at time $t_o$ and that the supply voltage for this wiper is derived from the signal U so as to be cut off prior to that time. With lead $P_{i6}$ de-energized for want of a diode link between leads $L_1'$ and $C_6''$, the output of NAND-gate $NG_6$ remains true and no change occurs in the circuitry of stage SIN so that NAND-gate $NG_9$ continues to generate the signal $\bar{I}$ which unblocks the gate $NG_{12}$ whereby the clock pulses H are inverted by that gate to appear in the output thereof as interruptions of the voltage A. The leading edge of the first pulse H, therefore, advances the selector onto the next signal path by stepping the wiper SC which engages its bank contact 1C. This energizes the lead $C_1'$ for a brief period until, again for want of a corresponding diode connection, the next clock pulse H at time $t_1$ steps the selector into the position of FIG. 3 with energization of lead $C_2'$. Once more, this condition is quickly terminated by another clock pulse H whose leading edge, at time $t_2$, steps the wiper SC onto bank contact 3C.

At this instant the concurrent energization of the two inputs $P_{i3}$, $C_3'$ of NAND-gate $NG_3$ removes positive voltage (of binary value "1") from one of the inputs of NAND-gate $NG_8$ so as to give rise to an output signal $X_8$ which trips the associated monoflop $MF_1$ whereby an input of NAND-gate $NG_9$ is also de-energized, thus giving rise to an enabling signal Q. With $I = Q \cdot \bar{Y}$, and with $Y = 0$, $\bar{Y} = 1$ in the normal condition of monoflop $MF_4$, the signal I disappears in the output of NAND-gate $NG_{10}$ to de-energize another input of NAND-gate $NG_9$ which therefore remains conductive independently of the state of monoflops $MF_1$ and $MF_2$. Thus, the signal Q persists and unblocks the NAND-gate $NG_{14}$ for the passage of message pulses while the suppression of signal $\bar{I}$ (or generation of signal I) makes the NAND-gate $NG_{12}$ nonswitchable so as to prevent the clock pulses H from stepping the selector SLC.

With monoflops $MF_5$ and $MF_6$ both normal, the appearance of signal Q on the third input of NAND-gate $NG_{15}$ removes from the output thereof a positive voltage which had heretofore maintained the counter $B_1 - B_5$ at zero. Every subsequent clock pulse H, therefore, steps that counter until the count either reaches the numerical value 24 (energization of the reset outputs of stages $B_1$, $B_2$, $B_3$ and of the set outputs of stages $B_4$, $B_5$) or is interrupted by a shift from mark to space (tripping of monoflop $MF_5$) or vice versa (tripping of monoflop $MF_6$). In the former case the signal V is generated in the output of NAND-gate $NG_{16}$; in the latter case a resetting voltage reappears in the output of NAND-gate $NG_{15}$ to restart the count.

Gate $NG_{14}$, though shown included in stage SUP, could also form part of switching unit US. In fact, this gate may be omitted if the switches $CG_1 - CG_6$ are designed as three-input coincidence (AND or NAND) gates each also receiving the signal Q.

The synchronization signal S, though shown and described as emanating from receiver RM, could also be derived directly from the counter of subunit SUP by means of another NAND gate with four inputs connected to stages $B_1 - B_4$ in the manner in which the last four inputs of gate $NG_{16}$ are connected to stages $B_2 - B_5$, thus generating a pulse whenever the count reaches the numerical value 12. In the system actually illustrated, however, the decoder DEC in receiver RM contains all the circuitry necessary to detect not only the 12-mark synchronization code but all the 12-bit information codes included in a message M, the decoder receiving for this purpose not only the clock pulses H (along with the activation signal U) but also the signal $\bar{I}$ whose recurrence accompanies the transition from one signal path to the next. With the final bit of any information code invariably constituted by a space, signal S can be generated only by the synchronization (start/stop) code $C_s$ or by a malfunction resulting in the uninterrupted presence or absence of line current in the output of one of the demodulators of circuit FSK (FIG. 3). In the present instance it has been assumed, by way of example, that channels $L_1/C_3$ and $L_1/C_4$ carry normal messages $M_3$ and $M_4$, respectively, whereas channel $L_1/C_5$ is defective so that its message $M_5$ is an undifferentiated signal of magnitude "1"; such a signal may come into existence, for example, when the transmitter fails to insert an information code between successive synchronization codes.

The switchover to channel $C_3$ at time $t_2$ happens to coincide in this example with the beginning of a synchronization code $C_s$ so that signal S is generated after the twelfth clock pulse H. This signal S sets the flip-flop $B_6$ at time $t_3$ with generation of signal Z whose polarity is such that monoflop $MF_3$ is not switched but has no other effect upon the circuits so that counter $B_1 - B_5$ continues to advance in response to the first few bits of the following information code which are assumed to be marks. Since at least the twelfth bit of the latter code must be a space, the counter is reset before reaching the critical count of 24 so that signal V is not generated.

The next synchronization code $C_s$, terminating at time $t_4$, generates another signal S which resets the flip-flop $B_6$ and cancels its output Z, the resulting voltage change tripping the monoflop $MF_3$ to de-energize one of the inputs of NAND-gate $NG_{13}$ whose output therefore switches the second monoflop $MF_4$ associated with the feedback loop of NAND-gate $NG_9$. Monoflop $MF_4$ thereupon briefly restores the signal $\bar{Y}$ in the output of NAND-gate $NG_{11}$, with the consequent disappearance of signal Y in the input of NAND-gate $NG_{10}$ whereby the latter becomes conductive and brings back the signal $\bar{I}$. This quenches the signal Q in the output of NAND-gate $NG_9$ and clears the next clock pulse H through NAND-gate $NG_{12}$, thereby stepping the selector SLC so that its wiper SC moves onto contact 4C.

Since signal path $L_1/C_4$ is also programmed, the switchover from message $M_3$ to message $M_4$ in the output of NAND-gate $NG_{14}$ occurs almost without interruption as the simultaneous energization of leads $P_{i4}$ and $C_4'$ blocks the NAND-gate $NG_4$ as well as the NAND-gate $NG_7$ in cascade therewith. Thus, at time $t_5$, signal $X_8$ is replaced by signal $X_7$ which trips the monoflop $MF_2$ and again fires the NAND-gate $NG_9$ so that signal Q is promptly restored and halts the further advance of the selector. During the brief period of suppression of signal Q (and generation of signal $\bar{I}$), counter $B_1 - B_5$ is reset to zero by an output from NAND-gate $NG_{15}$.

The exploration of channel $C_4$ of line $L_1$ proceeds essentially in the same manner as that of channel $C_3$, except that the switchover is assumed to occur at some intermediate point of its information part so that the first synchronization signal S, which trips the flip-flop $B_6$, occurs only 31 clock cycles after the moment of switchover ($t_5$), at time $t_6$. The second such signal, at time $t_7$, again successively trips the cascaded monoflops $MF_3$, $MF_4$ to generate the release command which, at time $t_8$, causes the switchover to channel $C_5$.

It should be noted that the synchronization signal S persists until the appearance of the next space, i.e., a transition in signal voltage which clears the decoder counter, and that its length may therefore vary as shown.

With channel $L_1/C_5$ assumed to transmit a continuous defect signal, synchronization signal S occurs ineffectually after the first 12 clock pulses H, at time $t_9$, and persists for the next 12 clock pulses whereupon, at time $t_{10}$, counter $B_1 - B_5$ loads up to produce the signal V whereby NAND-gate $NG_{13}$ is again cut off, tripping the monoflop $MF_4$ and restarting the advance of the selector.

It will be evident that the skip signal V is also generated if only spaces appear in the message M' for 24 consecutive clock cycles, as in the case where the transmitter at the other end of the explored signal path is inoperative for any reason.

The presence of two NAND-gates $NG_7$ and $NG_8$, connected to interleaved sets of coincidence gates $NG_2$, $NG_4$, $NG_6$ and $NG_1$, $NG_3$, $NG_5$, lengthens the allowable response and recovery period of each NAND gate for a given cadence of stepping pulses so that channel exploration may proceed at a faster rate than would be otherwise possible. If the number of channels is not even, a dummy channel (always tested as "idle" and therefore skipped after 1 clock pulse) may be added in the input of one of these multiple-input NAND gates. Naturally, a larger number of such gates with interleaved inputs could also be used.

It will be evident that, with suitable changes in polarity, coincidence gates of AND rather than NAND type may be used in part or all of the system without materially changing its mode of operation.

WE CLAIM:

1. A terminal for a communication system, comprising:
- a receiver for incoming messages;
- a plurality of incoming signal paths adapted to carry such messages;
- switch means including a set of gates interposed between said signal paths and said receiver for normally blocking communication therebetween;
- monitoring means beyond said switch means for ascertaining the signal condition on any path connected to said receiver;
- selector means for scanning said signal paths in cyclic succession by temporarily opening the corresponding gates, said selector means having a set of outputs individually assigned to said gates;
- programming means connected to said outputs for marking certain of said gates as associated with signal paths ready to send messages;
- and stepping means controlled by said programming means for promptly advancing said selector means from any signal path not so marked to the next signal path in the cycle, said stepping means being also responsive to a release command from said monitoring means for advancing said selector means upon exploration of a signal path marked by said programming means.

2. A terminal as defined in claim 1 wherein said signal paths comprise $m$ incoming lines carrying n frequency channels each, said gates including line gates controlled by a first group of said outputs and channel gates controlled by a second group of said outputs, said programming means comprising coincidence means with one set of inputs respectively connected to all the outputs of one of said groups and with another set of inputs each provided with link means for connecting same to any number of outputs of the other of said groups for generating an unblocking signal for said switch means upon concurrent energization of corresponding inputs of said coincidence means by said selector means.

3. A terminal as defined in claim 2 wherein said link means form part of a diode matrix.

4. A terminal as defined in claim 2 wherein said one of said groups is said first group of outputs.

5. A terminal as defined in claim 4 wherein said coincidence means comprises a set of $n$ test circuits and monostable means connected to be tripped by said test circuits for producing said unblocking signal.

6. A terminal as defined in claim 5 wherein $m$ is an even number, said monostable means comprising a pair of monoflops with respective input connections to odd-numbered and even-numbered test circuits.

7. A terminal as defined in claim 5 wherein said stepping means comprises a feed circuit for supplying recurring block pulses to said selector means, said feed circuit including gate means connected to said monostable means for stopping said clock pulses in the presence of said unblocking signal.

8. A terminal as defined in claim 7 wherein said coincidence means is provided with a feedback circuit for maintaining said unblocking signal for an indefinite period, said feedback circuit including gate means connected to said monitoring means for breaking said feedback circuit in response to said release command.

9. A terminal as defined in claim 8 wherein said messages consist essentially of combinations of code pulses, said monitoring means comprising a decoder for detecting a predetermined code combination interpreted as an end-of-message signal.

10. A terminal as defined in claim 9 wherein each message is preceded and followed by said predetermined code combination, further comprising bistable means connected to said decoder for alternate setting and resetting by said predetermined code combination and for generating said release command upon a resetting thereof.

11. A terminal as defined in claim 8 wherein said monitoring means comprises a timing circuit connected to said feed circuit for measuring an interval defined by a predetermined number of clock pulses and for generating said release command in the absence of a substantial change in line voltage throughout said interval.

12. A terminal as defined in claim 11 wherein said messages consist essentially of marks and spaces, said monitoring means including a multistage counter for said clock pulses and clearing means for said counter responsive to any transition between a mark and a space.

* * * * *